Figure 1:
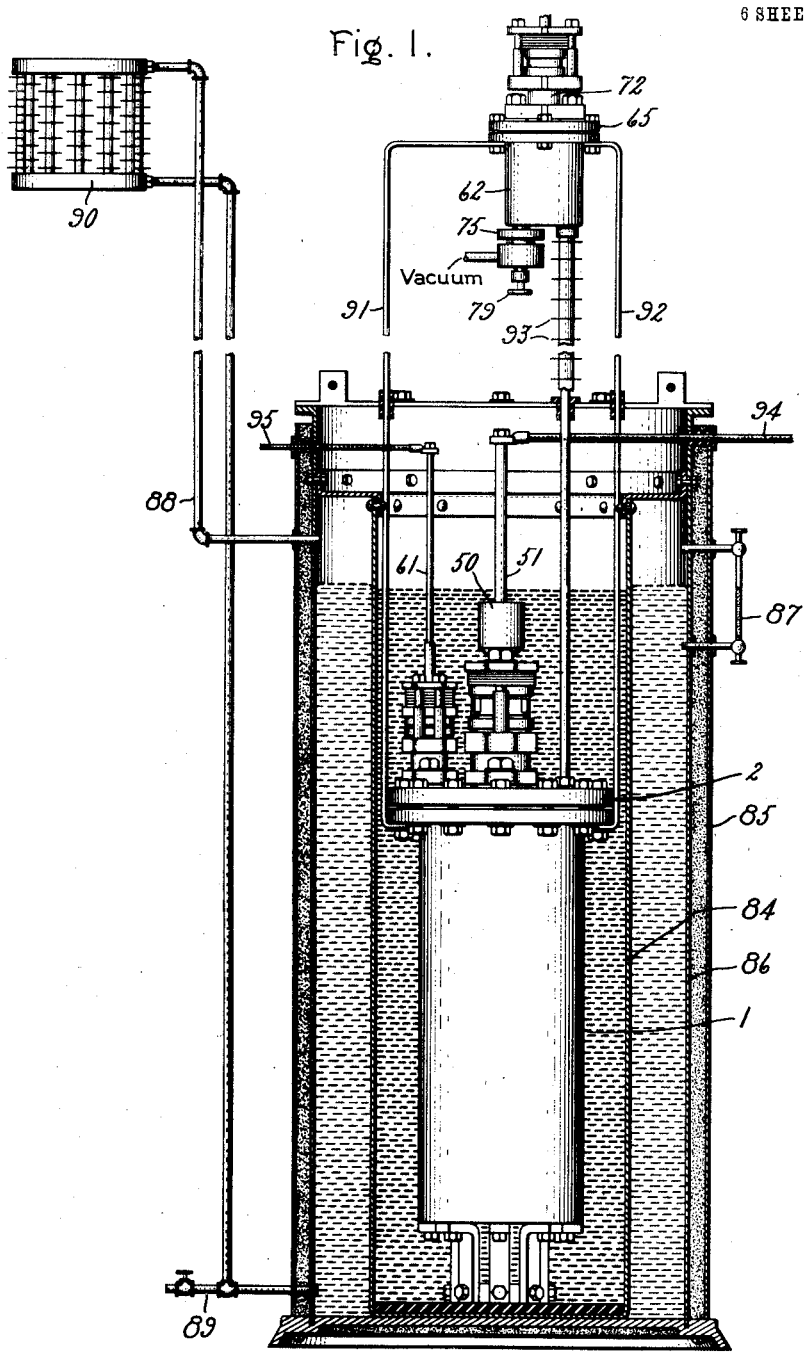

F. P. COFFIN.
MERCURY RECTIFIER.
APPLICATION FILED MAR. 3, 1909.

1,011,160.

Patented Dec. 12, 1911.
6 SHEETS—SHEET 2.

Witnesses:
George W. Tilden
J. Ellis Glen

Inventor:
Francis P. Coffin,
by
Att'y.

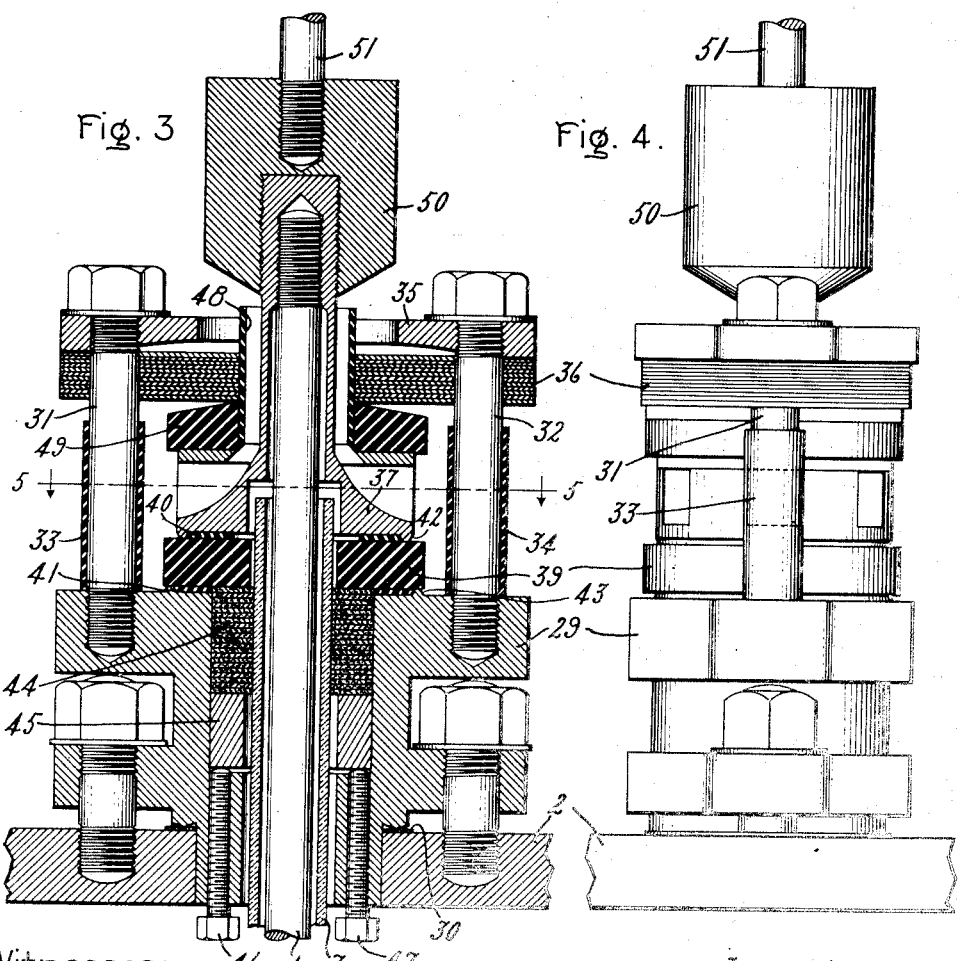

F. P. COFFIN.
MERCURY RECTIFIER.
APPLICATION FILED MAR. 3, 1909.

1,011,160.

Patented Dec. 12, 1911.
6 SHEETS—SHEET 4.

Witnesses:
George H. Tilden
J. Ellis Glen

Inventor:
Francis P. Coffin,
by Albert —
Att'y

F. P. COFFIN.
MERCURY RECTIFIER.
APPLICATION FILED MAR. 3, 1909.

1,011,160.

Patented Dec. 12, 1911.

6 SHEETS—SHEET 5.

Witnesses:
George H. Tilden
J. Ellis Glen

Inventor:
Francis P. Coffin,
by Albert H. Davis
Att'y.

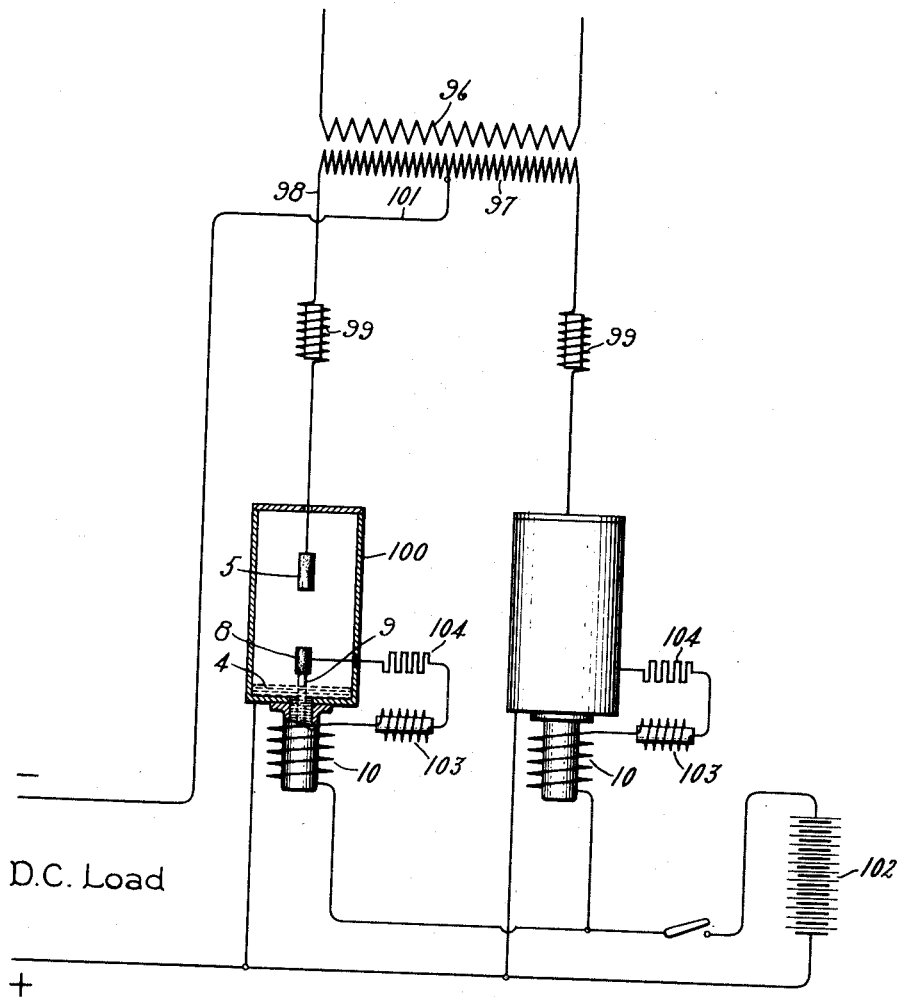

UNITED STATES PATENT OFFICE.

FRANCIS P. COFFIN, OF SCHENECTADY, NEW YORK, ASSIGNOR TO GENERAL ELECTRIC COMPANY, A CORPORATION OF NEW YORK.

MERCURY-RECTIFIER.

1,011,160.     Specification of Letters Patent.     Patented Dec. 12, 1911.

Application filed March 3, 1909. Serial No. 481,091.

*To all whom it may concern:*

Be it known that I, FRANCIS P. COFFIN, a citizen of the United States, residing at Schenectady, county of Schenectady, State of New York, have invented certain new and useful Improvements in Mercury-Rectifiers, of which the following is a specification.

My present invention relates to the art of mercury vapor apparatus and comprises a device capable of carrying heavy currents and suitable for use as a rectifier in electric railway systems and in other installations where rotary converters and motor generator sets have heretofore been used.

My improved vapor device is capable of handling electrical power in large quantities, both as concerns current and voltage, even up to several hundred kilowatts.

My invention also includes certain novel methods particularly applicable to the handling of large quantities of electrical energy. It also includes many details of construction, some of which are apparently essential to the successful operation of a vapor device under the severe conditions for which the present apparatus is intended.

According to my present invention, the rectifying apparatus comprises means for establishing a mercury arc in a vacuum tight metal envelop equipped with various adjuncts for insuring successful operation when the energy transmitted by the mercury arc is large in quantity. The apparatus includes a special lining for preventing the cathode spot from wandering from the mercury electrode to the metal walls of the vessel, this lining being of such material and so disposed as to furnish an annular condensing chamber effective for keeping excess mercury vapor of the normal current path, while fulfilling other functions as hereinafter set forth. The apparatus is also provided with means for protecting the anode from the direct action of the cathode blast, and includes other adjuncts for preventing "striking back," even at currents of several hundred amperes. Special means are provided for conveying these heavy currents to the main anode while maintaining a high state of vacuum within the envelop. The starting means is an adaptation of the floating plunger starter heretofore used in mercury lamps, but it acts in conjunction with an auxiliary anode arranged in a novel way and possessing certain special functions. Current is led to this auxiliary anode through a seal of novel type. The vacuum is maintained, and an even and uniform temperature assured, by methods which are in some respects new and which contribute materially to the success of the apparatus when used for high power work and more particularly when the load is subject to interruptions or violent fluctuations, as in railway work.

Figure 2:
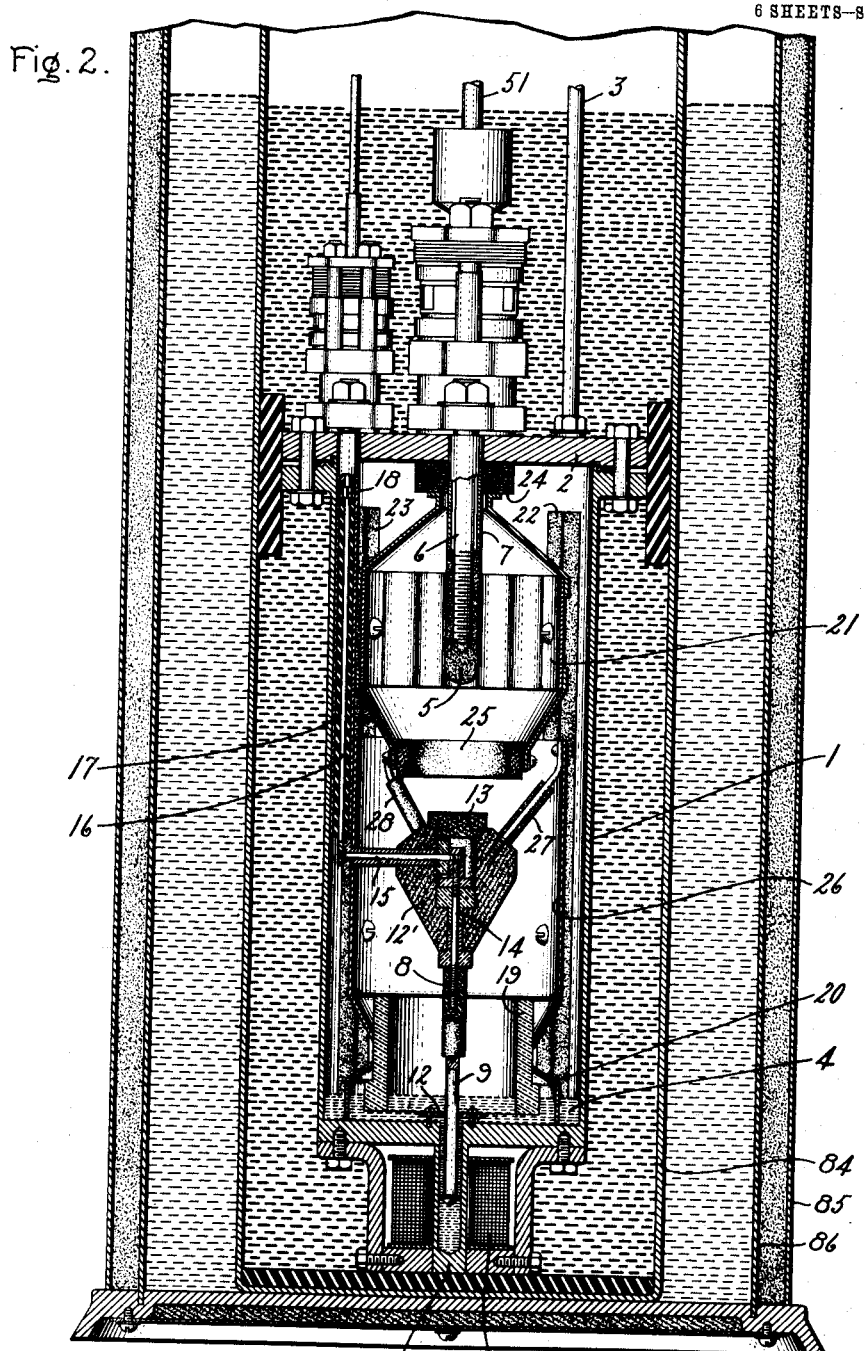
Figure 8:
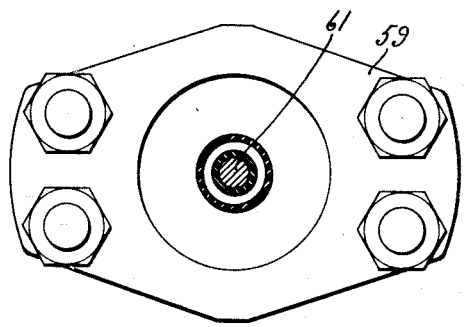
Figure 7:
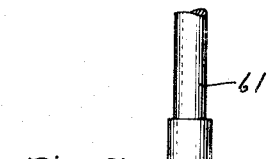
Figure 6:
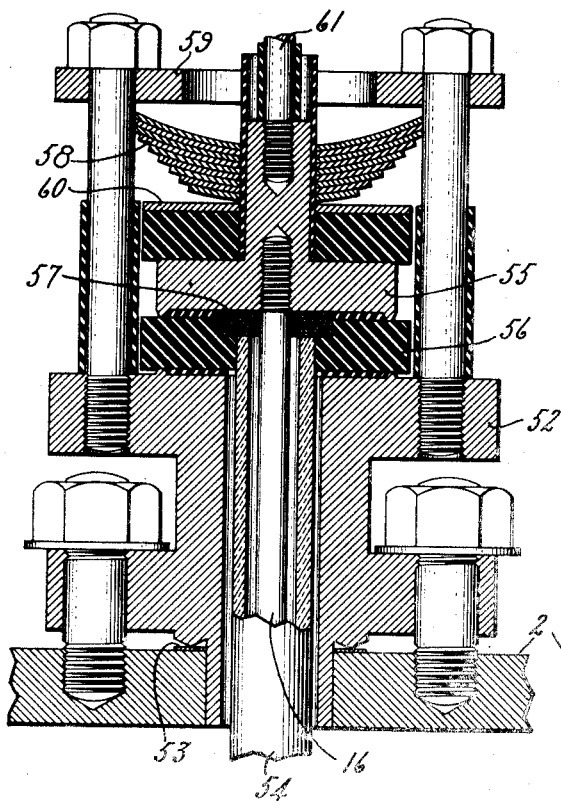
Figure 9:
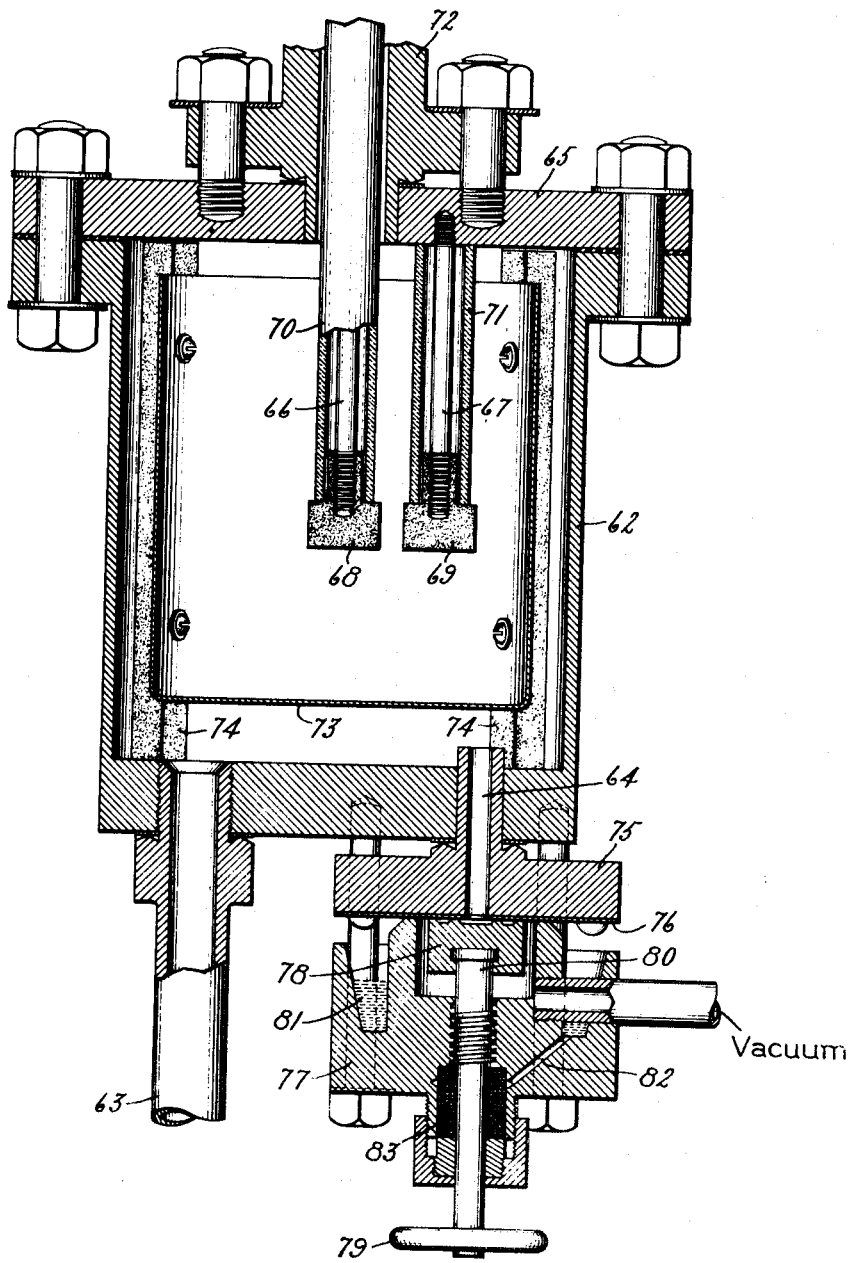

In the accompanying drawings, Figure 1 is an elevation, partly in section, showing the complete apparatus somewhat diagrammatically, except for the electrical connections, which, for the sake of simplicity, have been in part omitted; Fig. 2 is a sectional elevation of the rectifier and its inclosing envelops; Figs. 3, 4 and 5 are, respectively, a sectional elevation, an end elevation and a sectional plan of the seal through which current is supplied to the main anode; Figs. 6, 7 and 8 are similar views of the auxiliary anode seal; Fig. 9 is a sectional elevation through the magnesium exhaust apparatus; and Fig. 10 is a diagram of electrical connections which may be used when the rectifier is in commercial operation.

The rectifying arc is maintained in an air-tight metal envelop 1, preferably of steel, having a removable cover 2 through which the air may be exhausted by a suitable apparatus connected with pipe 3. At the bottom of this steel envelop 1 is a pool of mercury 4 serving as cathode for the rectifying arc and directly in contact and, therefore, in electrical connection with the steel envelop 1. The main anode 5 is in the upper part of the steel envelop and may be of graphite or other suitable material and supplied with current through a copper or iron conductor 6 inclosed and protected by an insulating sleeve 7 of porcelain, silica, or asbestos and passing through the top 2 of the envelop by way of the gas-tight seal shown in elevation in Fig. 2 and shown in detail in Figs. 3, 4 and 5.

In addition to the main anode 5, the rectifier is provided with an auxiliary anode 8 arranged near the cathode and initially contacting with the floating iron plunger 9. The latter carries a small puddle of mercury in its cupped upper end and is movable downward by means of a solenoid 10 inclosing a tubular extension 11 of the steel envelop. An annular lava plate 12 serves to center plunger 9 in the tubular extension 11. The auxiliary anode 8 is stationary and forms the apex of a conical arc deflector comprising a graphite cone 12' having a central cavity closed at the top by a screw-threaded plug 13, into which cavity project the insulated steel current supply conductors 14 and 15, one of which is connected directly to auxiliary anode 8, and the other of which connects with a vertical current supply conductor 16 which passes up through an insulating tube 17 and out through cover 2 by way of the seal shown in elevation in Fig. 2 and shown in detail in Figs. 6, 7 and 8. In order that the cover 2 may easily be removed when the apparatus is to be taken down, the vertical conductor 16 is made in two parts connected together by a telescoping joint 18 located slightly below cover 2.

The mercury at the bottom of the exhausted envelop carries a floating ring 19 of clay or silica serving to limit the wandering of the cathode spot. Outside this insulating ring is a metal collar 20 resting on the bottom of the steel envelop 1 and having its upper edge bent inward to form an annular bearing for the floating silica ring 19. Surrounding the main anode 5 is a sheet metal hood 21 separated from the walls of the steel envelop 1 by vertical sticks of asbestos 22 and 23 serving as spacers to insure an annular chamber between the hood and the walls of the steel envelop. The hood 21 is preferably made of sheet metal and in three parts, as shown in the drawing, the central or cylindrical part being fluted as shown. The hood is insulated from the cover 2 by asbestos washers 24, and its lower end forms a constricted opening lined by the graphite ring 25. Through this opening the main arc plays when current flows from main anode 5 to mercury cathode 4. Somewhat below hood 21, but similarly supported and spaced from the walls of the main anode, is a sheet metal shield 26 having its lower edge convergent to meet the floating silica ring 19. This shield is provided with depending rods 27 and 28 inclosed in graphite sleeves and serving as supports for the conical arc deflector 12'.

The main anode seal of the rectifier shown in details in Figs. 3, 4 and 5 comprises a steel plug 29 bolted to cover 2 and separated therefrom by an aluminum washer 30. Seated in the top of this plug 29 are two vertical bolts 31 and 32 enveloped in fiber tubes 33, 34 and connected at their tops by a yoke 35 adjustable vertically to vary the tension given on laminated spring 36 used to hold other parts of the seal in intimate contact. The other parts of the seal comprise the steel current supply conductor 6 inclosed in its insulating tube 7, from which it is separated by an annular space. Conductor 6 is screw-threaded at its upper end into a bell-shaped cap 37 having channels 38 therein for the circulation of a cooling liquid as hereinafter set forth more in detail. This cap 37 is seated on a fiber ring 39, which in turn rests on the top of plug 29. Rubber gaskets 40 and 41 are arranged above and below ring 39 to insure an air tight joint. The gaskets are protected from the disintegrating action of the oil used for cooling by means of annular rims 42 and 43 arranged respectively on the bottom of cap 37 and on the top of plug 29. Asbestos washers 44 held under compression by a steel ring 45 adjustable by vertical set screws 46 and 47 prevent current leakage or Geissler discharges from the plug 29 to other parts of the seal. The cap, ring, gaskets, etc. above enumerated are held tightly in position by the laminated steel spring 36 which is insulated from the current carrying conductors by a vertical fiber bushing 48 and which is spaced from cap 37 by an annular fiber ring 49 having a convex upper surface. The cap 37 and its inclosed current supply conductor 6 are screwed into a cooling knob 50 of steel, copper or other suitable metal from which connection is made with the source of current-supply by way of a conductor 51 screwed therein.

The seal just described has many advantages. The heat developed in the anode and conducted upward through the current supply conductor 6 is largely dissipated by the cooling knob 50 and in any event cannot reach the gaskets and other organic material of the seal except by passing downward again through the thin oil-cooled walls of the cap 37. This construction permits running the anode and anode supply conductor 6 at such a high temperature that substantially no condensation of mercury takes place within the seal, as for instance, in the annular chamber separating the current supply conductor from its porcelain or asbestos envelop 7, or within the annular chambers of the cap 37.

The auxiliary seal shown in Figs. 6, 7 and 8 is in many respects similar to the main seal. It comprises a plug 52 seated in cover 2 and separated therefrom by an aluminum gasket 53. The current supply conductor 16 inclosed in its insulating envelop 54 passes upward and is screw-threaded to a cap 55 seated on a fiber ring 56 provided with rubber gaskets above and below, as in the seal previously described. In this modification the insulating asbestos rings 57 lie in a chamber counter-sunk in the top of fiber block 56 and serve as an insulating packing for that portion of the seal. The spring 58 is made up of curved laminations held in place by the yoke 59 bearing on a metal ring 60 suitably insulated from the cap 55 to which current is supplied by way of an insulated conductor 61. Owing to the fact that the current supplied to the auxiliary anode may be relatively small, the seal just described is not provided with oil circulating ducts in the cap.

As a means for maintaining an operative vacuum within the envelop of the rectifier, I make use of apparatus shown in Fig. 9. This apparatus comprises a pot 62 having a tubular inlet 63 and a valve controlled outlet 64. The pot is closed by a cover 65 from which depend current supply conductors 66 and 67 terminating respectively, in magnesium or graphite electrodes 68 and 69 and enveloped respectively in porcelain tubes 70 and 71. Current supply conductor 67 is electrically connected directly with cover 65, but conductor 66 passes upward through a plug 72 and into a seal similar in all respects to the auxiliary seal shown in detail in Figs. 6, 7 and 8. The pot 62 is provided with a sheet metal lining 73 supported and held in place by vertical asbestos strips 74. The valve which controls the outlet 64 comprises a plug 75 faced on its lower surface by an aluminum gasket 76 against which is bolted the valve casing 77 in which the valve disk 78 can be raised or lowered by means of a hand wheel 79. The spindle 80 of the valve is free to turn in the valve disk 78 in order that aluminum gasket 76 may not be unduly worn during closure of the valve. An annular oil chamber 81 and ducts 82 serve to supply oil to the spindle packing 83.

Referring now to Fig. 1, it will be seen that the rectifier casing 1 together with its anode seals are submerged in oil in a metal tank 84, preferably of copper. The copper tank 84 is insulated from the rectifier envelop and is itself enveloped almost entirely in a water bath contained in a tank having an outer wall 85 and an inner wall 86 with a packing of asbestos fiber between the walls. This water tank may be provided with a water gage 87 and with a steam outlet 88 and a water inlet 89 communicating with the radiator or other suitable steam condenser 90. The exhausting apparatus is preferably supported some distance above the water tank and may conveniently be supported by solid rods 91 and 92 bolted to the rectifier envelop. By putting the exhausting apparatus some distance above the rectifier and by putting heat radiating fins 93 on the exhaust pipe 3 almost all mercury vapor will be condensed in the pipe and little will reach the pot 62 of the exhausting apparatus. A current supply conductor 94 passes through the wall of the water tank to establish connection with the main anode, and a similar conductor 95 supplies current to the auxiliary anode. For the sake of simplicity the connections of the starting solenoid 10 have been omitted from Figs. 1 and 2, but will be understood by reference to Fig. 10.

To put the apparatus in condition for use, I assemble the elements as shown in the drawing and then pump out envelop 1 with a mechanical pump by way of the exhausting pot 62 and its valve controlled outlet 64. The anodes and other parts within the exhausted envelop can then be treated with current to free them of gases and to put them in best operative condition. After this, the mechanical pump may be disconnected and thereafter the requisite vacuum may be maintained by the magnesium exhaust apparatus of Fig. 9. This apparatus depends for its action on the passage of current between the magnesium electrodes 68 and 69. When the vacuum within the pot is good, the voltage applied to these electrodes is only sufficient to maintain a Geissler discharge between them, but in case the vacuum falls, as by liberation of gases from the working parts or by leakage through a seal, this Geissler discharge will change to an arc, resulting in vaporization of magnesium from an electrode. This magnesium vapor appears in some way to combine with or condense the surrounding gases forming solid products which are deposited on the walls of the sheet metal lining 73. The magnesium vapor does not diffuse over into the main rectifier chamber because of the tortuous nature of the passage and because of the relative coolness of the intervening pipe. Similarly, mercury vapor does not reach the magnesium electrodes to interfere with their normal action.

Although my improved rectifier may be connected in circuit in various ways, the connection illustrated diagrammatically in Fig. 10 possesses some advantages. Throughout this figure, the reference numerals correspond with those used in Fig. 1, so far as the diagrammatic nature of the drawing admits. It will be understood that for the system illustrated in this figure, two rectifiers are necessary, each like that of Fig. 1, and each serving as a valve for current from one terminal of the transformer or other source of power. A transformer primary 96 is connected with a source of alternating current, and its secondary 97 has one terminal 98 connected through a reactance 99 with the main anode 5 of the rectifier 100. The cathode 4 of this rectifier is connected to the positive side of the direct current load circuit. The other side of the load circuit is connected by a conductor 101 to the neutral point of the transformer secondary 97. The other terminal of the transformer secondary is similarly equipped with a rectifier and also delivers current to the positive side of the load circuit, which current after passing through the load also goes back through conductor 101 to the neutral point of the transformer. As a means for energizing the solenoids 10 which pull down the plungers 9 and start the arcs to auxiliary anodes 8, I may use a storage battery 102 having one terminal connected to the mercury cathode 4 and the other terminal connected to the auxiliary anodes, there being a reactance 103 and a resistance 104 in circuit with each starting solenoid 10 and its corresponding auxiliary anode 8.

Referring now to Fig. 2, it will be seen that when current is passed through solenoid 10 it draws down the plunger 9 and starts an arc between the auxiliary anode 8 and the mercury in the cupped top of plunger 9. After complete submersion of the plunger, this arc still persists with its cathode spot on the surface of the mercury electrode 4, and permits the passage of current from main anode 5 to cathode 4 during those intervals of time when the anode is positive with respect to the cathode. The cathode spot cannot wander over to the wall of the rectifier envelop because of the insulating ring 19, and it will not flash up to the sheet metal lining 26 because the latter is insulated from all parts of the circuit. Furthermore, the size and disposition of the shield insures a vapor path of less resistance than any path including the shield as an intermediate conductor, thereby obviating any danger of forming an arc at a point other than at the surface of the mercury cathode 4. Since my apparatus carries heavy currents, the vaporization of mercury at the cathode is very considerable, and the arc is accompanied by a powerful blast issuing from the mercury cathode and directed upward toward the anode. By virtue of the special arrangement of the auxiliary anode 8 and the conical deflector 12', the cathode blast is diverted outward and passes up through the annular space intervening between shield 26 and the anode hood 21. But the real arc proceeds upward through ring 25 to the main anode 5, though carrying with it but little excess mercury vapor. The rapidly moving blast which issues from the annular space between shield 26 and hood 21 acts mechanically to drive outward any foreign gas or vapor, thereby taking them out of the arc path and concentrating them near the top of envelop 1 in the annular space above hood 21. From here they are driven upward through exhaust pipe 3 by the mercury blast which extends up this tube for a part of its length but which condenses before reaching the magnesium exhaust pipes, thus freeing the gases in the neighborhood of the exhausting apparatus and in position to be rapidly drawn up and acted upon by the vaporized magnesium. The cathode blast, after passing outward, strikes the oil cooled walls of envelop 1, where the mercury vapor is condensed and returned to the bottom of the receptacle and is collected in the annular space outside the ring 20. From this space it gradually seeps through under the lower edge of the ring and is thereby filtered and freed from soot, oxid, and possibly other foreign matter. Floating ring 19 also acts to a certain extent as a mercury filter. Both ring 19 and ring 20 serve to prevent splashing of the mercury and exposure of the envelop bottom when the rectifier is in use on railway cars.

The hood 21 which envelops main anode 5, insures a high temperature to the anode, thus preventing condensation of mercury vapor in the immediate neighborhood. It also acts to prevent globules of mercury from falling or spattering on the anode from cooler parts of the envelop. By having the central portion of the hood 21 of fluted outline, the heat and light emanating from anode 5 are reflected to all parts of the inclosed space instead of being concentrated at the center as would be the case if the hood were cylindrical.

As previously indicated, the oil bath surrounding the rectifier acts as a cooling means and is in turn cooled by the water bath with which it is surrounded. I prefer to have this water bath run at boiler temperature and dissipate energy through the steam carried off to the auxiliary condenser or radiator. Furthermore, I desire to keep this water bath near the boiling point at all times and therefore, utilize the double-walled jacket with heat insulating packing, to prevent the water from cooling off when the rectifier is running at light load or is temporarily shut down, as might often occur in railway work.

What I claim as new and desire to secure by Letters Patent of the United States, is,—

1. In a vapor device, an exhausted metal envelop, and a lining therefor consisting in part at least of metal.

2. In a vapor device, an exhausted metal envelop and an insulated metal lining therefor.

3. In a vapor device, an evacuated envelop, means for maintaining an arc therein, a lining spaced apart from the wall of said envelop, and means for deflecting the arc blast into the space between the envelop and its lining.

4. In a vapor device, an evacuated metal envelop, an anode and a cathode within said envelop, a hood enveloping said anode, and a metal shield interposed between said hood and said cathode and spaced from the wall of said envelop.

5. In a vapor device, an anode, and a hood therefor having a fluted inner surface.

6. In a vapor electric device, an anode, a coöperating cathode, a deflector interposed between said electrodes and a hood for said anode having an outlet surrounded by a ring of refractory material, said outlet and ring having a lesser diameter than the main portion of said hood.

7. In a rectifier, the combination of an evacuated envelop, means for maintaining an arc therein, and a circular deflector coöperating with a shield and a hood to divert excess vapor out of the path of said arc.

8. In a vapor device, an evacuated envelop, a mercury electrode therein, and a ring resting on the bottom of said envelop and operative to filter mercury returning to said electrode.

9. In a vapor device, the combination of a starting plunger, a solenoid for moving said plunger, an auxiliary anode with which said plunger initially contacts and a main anode directly above said anode and shielded thereby from the arc blast.

10. In a vapor rectifier, the combination of a metal envelop, an anode, a sheet metal hood enveloping said anode and having a constricted outlet, a metal shield below said hood and spaced from said envelop to form an annular condensing chamber, a mercury electrode at the bottom of said envelop, and an insulating ring in contact with said shield.

11. In a vapor rectifier, the combination of a metal envelop, a mercury electrode in contact therewith, a main anode coöperating with said mercury electrode, means for starting an arc between said anode and cathode, a deflector directly in the path of said arc, a shield inclosing said deflector, and a hood enveloping said anode, said shield and hood coöperating with said envelop to form an annular condensing chamber into which the arc blast can be diverted by said deflector.

12. The combination of an apparatus evolving condensible vapors and an exhaust apparatus comprising a pot with an inlet at the bottom, electrodes in said pot, and means forming a tortuous passage between said electrodes and said inlet.

13. In a vapor rectifier, the combination of an envelop, a current supplying conductor passing through said envelop and separated therefrom by an insulating tube, a cap secured to said current supply conductor, insulating rings above and below said cap, and a spring for holding said rings and cap in position against said envelop.

14. In a mercury rectifier, the combination of a current supply conductor, a hollow cap connected with said conductor and having passages for the circulation of a cooling fluid, and resilient means for holding said cap in position.

15. In a mercury vapor rectifier, the combination of a current supply conductor, a hollow cap connected therewith and having thin walls, insulating packing for said cap, and a cooling knob surmounting said cap.

In witness whereof, I have hereunto set my hand this 25th day of February, 1909.

FRANCIS P. COFFIN.

Witnesses:
BENJAMIN B. HULL,
HELEN ORFORD.